United States Patent
Sarchi et al.

(10) Patent No.: US 8,443,631 B2
(45) Date of Patent: May 21, 2013

(54) METHOD OF MAKING A LOW PMD OPTICAL FIBER

(75) Inventors: Davide Sarchi, Milan (IT); Maddalena Ferrario, Milan (IT)

(73) Assignee: Prysmian S.p.A., Milan (IT)

( * ) Notice: Subject to any disclaimer, the term of this patent is extended or adjusted under 35 U.S.C. 154(b) by 670 days.

(21) Appl. No.: 12/308,269

(22) PCT Filed: Jun. 22, 2006

(86) PCT No.: PCT/EP2006/063454
§ 371 (c)(1),
(2), (4) Date: May 21, 2010

(87) PCT Pub. No.: WO2007/147440
PCT Pub. Date: Dec. 27, 2007

(65) Prior Publication Data
US 2010/0232754 A1    Sep. 16, 2010

(51) Int. Cl.
*C03B 37/025*    (2006.01)

(52) U.S. Cl.
USPC .......................................................... 65/435

(58) Field of Classification Search
USPC .......................................................... 65/435
See application file for complete search history.

(56) References Cited

U.S. PATENT DOCUMENTS

| | | | |
|---|---|---|---|
| 4,504,300 A | 3/1985 | Gauthier et al. | |
| 5,316,562 A | 5/1994 | Smithgall et al. | |
| 5,418,881 A | 5/1995 | Hart, Jr. et al. | |
| 5,943,466 A | 8/1999 | Henderson et al. | |
| 6,240,748 B1 | 6/2001 | Henderson et al. | |
| 6,876,804 B2 * | 4/2005 | Chen et al. | 385/123 |
| 2001/0020374 A1 | 9/2001 | Roba et al. | |
| 2004/0017986 A1 | 1/2004 | Garner et al. | |

(Continued)

FOREIGN PATENT DOCUMENTS

| EP | 0 744 636 A2 | 11/1996 |
|---|---|---|
| EP | 1 384 700 A2 | 1/2004 |

(Continued)

OTHER PUBLICATIONS

Pietralunga et al., "Direct Observation of Local Birefringence and Axis Rotation in Spun Fiber With Centimetric Resolution"; IEEE Photonics Technology Letters, vol. 16, No. 1, pp. 212-214, (Jan. 2004).

(Continued)

*Primary Examiner* — Queenie Dehghan
(74) *Attorney, Agent, or Firm* — Finnegan, Henderson, Farabow, Garrett & Dunner, L.L.P.

(57) ABSTRACT

A method of making an optical fiber includes the steps of: providing an optical fiber preform; heating an end portion of the optical fiber preform so as to obtain a softened preform end portion; drawing the softened preform end portion to form the optical fiber; applying to the optical fiber a substantially sinusoidal spin having a spin amplitude and a spin period, the substantially sinusoidal spin being transmitted to the softened preform end portion, and determining an actual spin amplitude applied to the fiber, wherein the actual spin amplitude is the spin amplitude applied in correspondence to the softened preform end portion. The spin amplitude and spin period of the substantially sinusoidal spin are selected in such a way that a ratio of the actual spin amplitude to the spin period is in the range of approximately 0.8 to approximately 1.4 turns/m$^2$.

4 Claims, 4 Drawing Sheets

U.S. PATENT DOCUMENTS

| | | | |
|---|---|---|---|
| 2004/0022507 A1* | 2/2004 | Galtarossa et al. | 385/123 |
| 2004/0232571 A1 | 11/2004 | Tong et al. | |
| 2005/0163434 A1 | 7/2005 | Kwon et al. | |

FOREIGN PATENT DOCUMENTS

| | | |
|---|---|---|
| EP | 1 226 415 B1 | 1/2005 |
| GB | 2 101 762 A | 1/1983 |
| WO | WO-99/67180 | 12/1999 |
| WO | WO-02/03115 A1 | 1/2002 |
| WO | WO-2004/021055 A1 | 3/2004 |
| WO | WO-2004/028989 A1 | 4/2004 |
| WO | WO-2004/058654 A1 | 7/2004 |

OTHER PUBLICATIONS

Wang et al.; "Characterization of spun fibers with millimeter spin periods", Optic Express, vol. 13, No. 10, pp. 3841-3851, (May 2005).
Ferrario et al.; "Alternate Spin Profile Reconstruction in Low-PMD Fibers", jThE52, 2005 Quantum Electronics and Laser Science Conference (QELS), pp. 1714-1716, (2005).

* cited by examiner

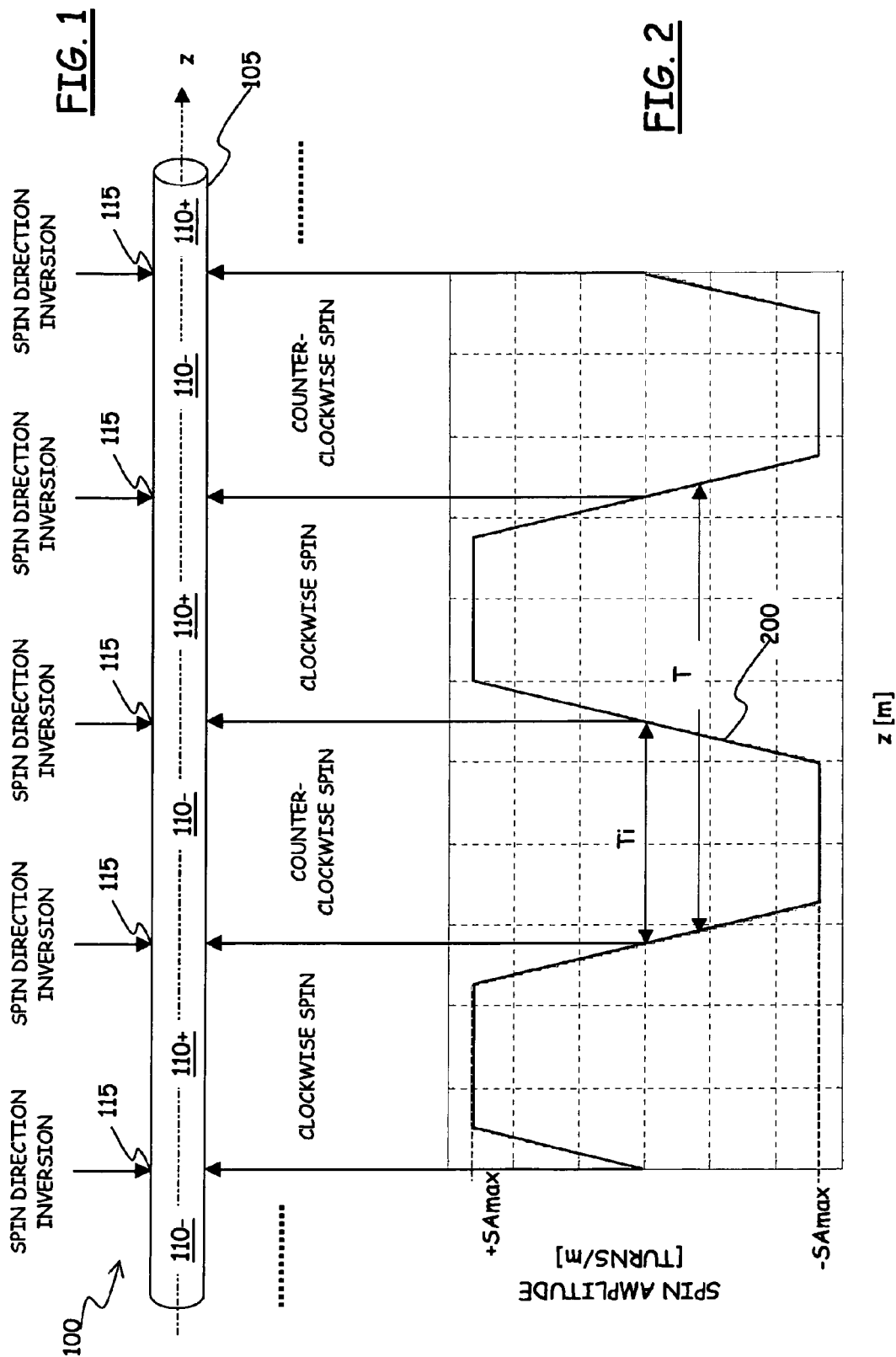

METHOD OF MAKING A LOW PMD OPTICAL FIBER

CROSS REFERENCE TO RELATED APPLICATION

This application is a national phase application based on PCT/EP2006/063454, filed Jun. 22, 2006, the content of which is incorporated herein by reference.

BACKGROUND OF THE INVENTION

1. Field of the Invention

The present invention generally relates to the field of optical fibers, and to manufacturing methods thereof. More particularly, the present invention concerns a method of making optical fibers featuring a low polarization mode dispersion.

2. Description of the Related Art

Optical signals transmitted through single-mode optical fibers comprise two orthogonal polarization modes, usually denoted Transverse Electric (TE), and Transverse Magnetic (TM). In case the fiber has a perfectly cylindrical core of uniform diameter, the two TE and TM modes propagate at a common velocity (i.e., they have same propagation constants $\beta_1 = \beta_2$). However, in real-life optical fibers the cylindrical symmetry of the fiber core may be disrupted due to shape defects or non-uniform stresses. As a result, the refractive index becomes dependent on the polarization state, and the two TE and TM modes exhibit different propagation constants $\beta_1 \neq \beta_2$. A phase difference builds up between the two polarization modes as they propagate along the fiber, and the fiber is said to exhibit "birefringence" (or, equivalently, the fiber is said "birefringent"). An indication of the fiber birefringence is provided by the absolute value difference $\Delta\beta = |\beta_1 - \beta_2|$ between the two propagation constants $\beta_1$ and $\beta_2$ for the two TE and TM modes. In particular, the birefringence introduced by shape and stress asymmetry is known as "intrinsic birefringence".

The structural and geometrical irregularities of the optical fiber that give rise to birefringence typically originate from the fiber preform itself, and are modified during the process of drawing the fiber. This process is usually carried out by means of an apparatus known as a "drawing tower", starting from a glass preform. In practice, after the preform has been placed in vertical position and heated to a temperature above the softening point within a suitable furnace, the molten material is drawn downwards at a controlled speed, in such a way as to produce a threadlike element that forms the optical fiber. In this process, asymmetrical stresses are typically applied to the fiber.

In a birefringent fiber, the two components TE and TM of the fundamental optical mode propagating through the fiber, assumed to be initially in phase with each other, return to be in phase again only after a certain propagation length, commonly known as the "beat length" ($L_B$). In other words, the beat length indicates the period of repetition of a certain state of polarization (on the assumption that the fiber maintains a constant birefringence over this length). The beat length $L_B$ depends on the birefringence, and in particular it is: $L_B = 2\pi / \Delta\beta$. Therefore, the higher the birefringence, the shorter the beat length.

Apart from a restricted class of fibers, known as "polarization-preserving" or "polarization-maintaining" optical fibers, in which asymmetry is deliberately introduced to generate birefringence, birefringence is normally detrimental to the optical fiber performance.

In fact, when pulsed signals are transmitted through an optical fiber, birefringence is a cause of pulse spreading, since the two polarization components, TE and TM, of the signal travel at different group velocities, and become dispersed. This phenomenon, known as "Polarization Mode Dispersion" (shortly, PMD), has been widely studied in recent years because of its importance in periodically amplified light guide systems.

Typically, the PMD phenomenon leads to a limitation of the width of the signal transmission band and, consequently, a degradation of the performance of the optical fibers along which the aforesaid signals are transmitted. This phenomenon is therefore undesirable in systems of signal transmission along optical fibers, especially in those operating over long distances, in which it is necessary to minimize any form of attenuation or dispersion of the signals to guarantee high performances in transmission and reception.

A known way to produce optical fibers with reduced PMD is to include a fiber spinning step during the fiber drawing stage. For the purposes of the present description, the term "spin" identifies a torsion that is frozen-in during the fiber drawing, being applied to a viscous portion of the fiber and kept as a structural modification of the fiber after cooling.

The benefits deriving from spinning the fiber during drawing are for example described in the U.K. patent application GB-A-2101762: in that document, it is discussed that spinning is performed at a relatively high rate, so that its spatial repetition frequency, or spin period, is small compared to the fiber beat length $L_B$; as a result, a "spun" optical fiber features a reduced contribution of birefringence due to form and stress asymmetries.

Due to spinning, the fiber under drawing undergoes a rotation of its polarization axes. As a result, when optical pulses are transmitted into the optical fiber, they propagate alternately on the slow and fast birefringence axes, thus compensating the relative propagation delay and reducing the pulse spreading. This is qualitatively equivalent to having a local effective refractive index for the optical pulses equal to the average refractive index on the two axes, the average being taken over the pulse length along the fiber. Theoretical studies have shown that the dominant process for the reduction of PMD in a spun fiber is the averaging of the local fiber anisotropy by the rapid procession of the axes of asymmetry along the fiber.

Several spin functions have been proposed in the art. For example, in the above cited U.K. patent application GB-A-2,101,762 it is stated that the preform may be spun at a substantially constant rate, but it could even reverse in direction, oscillating from a right-handed to a left-handed twist. The U.S. Pat. No. 4,504,300 addresses drawbacks related to rotation of the preform, and proposes a spinning technique consisting in rotating the fiber, instead of the preform, during fiber drawing. The U.S. Pat. No. 5,418,881 proposes to impress the spin to the fiber alternately clockwise and counter-clockwise direction. Alternate spinning is also proposed in the U.S. patent application US2001/0020374, as preferred to unidirectional spinning, since it prevents the presence of residual fiber torsions (i.e., of residual fiber twists) on the fibers wound onto the collecting spool, thus making easier both the unwinding and wiring operations of the same.

In the published International application WO 2004/058654, a method is described wherein a substantially sinusoidal spin is applied to an optical fiber while drawing it. The spin function frequency, the length of the viscous zone of the fiber being drawn, and the drawing speed are such that each optical fiber portion, while being in the viscous state, undergoes a torsion and at least 50% de-torsion. In this way, the amplitude of the frozen-in spin function (i.e., the torsion permanently impressed on the fiber, when cooled, during the spinning process, as a result of the torsional deformation undergone by the viscous zone of the fiber material in the drawing furnace) is much lower than the amplitude of the actually imparted spin function (i.e. the torsion effectively applied to the fiber during the drawing process; the actually imparted spin function corresponds to the spin applied to the fiber by a spinning apparatus, less mechanical effects like slippage at the interface between the fiber and the spinning apparatus); however, despite this, a significant PMD reduction is achieved.

In WO 2004/058654 it is pointed out that experiments revealed a significant difference between the torsion applied to the fiber during drawing and the frozen-in torsion; in particular, the difference between the applied torsion and the frozen-in torsion (both expressed in turns per meter) is very small at low values of the spin function frequency, while it increases with the increase in the spin function frequency; in other words, the transfer of a spin function to the fiber depends on the spin function period: the longer the spin function period, the higher the transferred spin amplitude, with a different maximum at a certain period value. In particular, referring to FIGS. 4 and 5 of the cited application, and denoting ν the spin function frequency, L the viscous zone length, V the drawing speed, and k a dimensionless parameter equal to ratio $\rho VL/\mu$, being $\rho$ the density of the fiber material and $\mu$ the viscosity thereof in the viscous zone, the lines labeled "k<∞" show that the difference between the applied torsion and the frozen-in torsion is substantially null for small νL/V values, while it increases with increasing νL/V values, with a difference maximum at a certain νL/V value.

In the published International application WO 2002/03115 it is disclosed that spin functions can be optimized to reduce the PMD, depending on the fiber beat length. In particular, if the spin period is longer than the beat length, the spin function is optimized only for that beat length. On the contrary, if the spin period is shorter than the beat length, the spin function remains the optimum one also for different beat lengths. Since the fiber beat length is in general not known before drawing the fiber, and it varies along the fiber, optimized spin functions with short spin periods are preferred. In particular, from WO 2002/03115 it can be deduced that the beat length of an optical fiber is not affected by the spinning process, as it depends only on the birefringence of the fiber (in that document there is stated that in a commercial production of optical fibers of the same type, i.e. having substantially the same refractive index profile and made by the same production process, an expected beat length can be generally determined, before the drawing of the optical fiber, in a statistical way, or by DGD—Differential Group Delay—measurements on the unspun fiber). WO 2002/03115 also states that advantageously the period p of the spin function may be chosen so as to be lower than the expected fiber beat length: in such a case, the inventors have found that the variability with respect to the fiber beat length of the spin function parameters useful for obtaining a substantially periodic DGD is further reduced. Generally speaking, the optimum spin depends on the fiber beat length. However, under the short period assumption the solutions are independent on the beat length.

In S. M. Pietralunga, M. Ferrario, P. Martinelli, M. Martinelli, "*Direct Observation of Local Birefringence and Axis Rotation in Spun Fiber With Centimetric Resolution*", IEEE Photonics Technology Letters, Vol. 16, No. 1, January 2004, pp. 212-214, a measurement method is described that allows the direct observation of the rotation of the local linear birefringence axes along a spun fiber, and brings into evidence the periodic behavior of the birefringence retardation, as theoretically forecasted, along fibers spun with a constant spinning rate during the drawing stage.

In Y. Wang and C.-Q. Xu, "*Characterization of spun fibers with millimeter spin periods*", Optic Express, 16 May 2005, Vol. 13, No. 10, pp. 3841-3851, a method is proposed to precisely measure short spin periods (of the order of a few millimeters) with a spatial resolution of 0.1 mm. Constant (i.e., unidirectional) spin is considered.

In M. Ferrario, S. M. Pietralunga, R. Bratovich, and M. Martinelli, "*Alternate Spin Profile Reconstruction in Low-PMD Fibers*", JThE52, 2005 Quantum Electronics and Laser Science Conference (QELS), pp. 1714-1716, a measurement technique is described according to which any kind of spin profile, like a sinusoidal spin profile, transferred into fibers during the drawing process is accurately determined by exploiting a cut-back method together with a deterministic waveplate model.

SUMMARY OF THE INVENTION

In view of the state of the art outlined in the foregoing, the Applicant has observed that preferred spin functions are characterized by relatively long spin periods (so that the transferred spin amplitude is increased), but significantly shorter than the fiber beat length (so that the spin function is optimized, in terms of PMD reduction achievable, for all those fibers featuring a beat length higher than the spin period).

The Applicant has observed that longer beat lengths would expand the population of candidate spin functions adapted to optimize the PMD in the drawn fiber.

The Applicant has found that alternate spinning applied to a fiber reduces the fiber birefringence, and thus increases the fiber beat length. This is an unexpected result, since the general belief is that the beat length of an optical fiber is independent from the spinning process, as it depends only on the birefringence of the fiber (as stated for example in WO 2002/03115).

In particular, the Applicant has found that a proper choice of the parameters of a spin function applied to the fiber leads to a reduction in the birefringence, and thus to an increase in the beat length of the spun fiber, compared to birefringence, respectively the beat length, of a similar, but unspun fiber.

The increase of the fiber beat length increases the range of useful spin function periods, while fulfilling the condition that the spin period should be lower than the fiber beat length (as discussed above, the fulfillment of this condition makes the reduction in PMD achieved by applying the spin function substantially independent from the fiber beat length).

For example, it is possible to choose a longer spin period, with the advantage of not incurring in the problems of reduced spin amplitude transfer, while being reasonably sure that the condition that the spin period be lower than the fiber beat length (i.e. that the reduction in PMD achieved by applying the spin function is substantially independent from the fiber beat length) holds true for a larger population of fibers.

The Applicant has found that a significant increase in the beat length of the spun fiber can be achieved by applying a substantially sinusoidal spin function to the fiber while drawing it, wherein a value of the spin amplitude actually imparted to the fiber, in turns per meter, falls in a range from approximately 0.8 to approximately 1.4 times the spin period, and preferably around 1.0. Within this range, beat length increases up to 40-50% have been experienced.

According to an aspect of the present invention, a method of making an optical fiber is provided.

The method comprises the steps of:
providing an optical fiber preform;
heating an end portion of the optical fiber preform so as to obtain a softened preform end portion;
drawing the softened preform end portion to form the optical fiber;
applying to the optical fiber a substantially sinusoidal spin having a spin amplitude and a spin period, the substantially sinusoidal spin being transmitted to the softened preform end portion, and
determining an actual spin amplitude applied to the fiber, wherein said actual spin amplitude is the spin amplitude applied in correspondence of said softened preform end portion,
said spin amplitude and spin period of the substantially sinusoidal spin are selected in such a way that a ratio of said actual spin amplitude to said spin period is in the range from approximately 0.8 to approximately 1.4 turns/$m^2$.

For the purposes of the present invention, the terms "spin", "spinning" and "spun" all relate to a torsion that is frozen-in in the fiber during drawing, being applied to a viscous portion of the fiber and kept as a structural modification of the fiber while the latter is cooled. In other words, a spun fiber will keep this alteration as an intrinsic and permanent deformation. By "(actual) spin amplitude actually imparted to the fiber" or, equivalently, "(actual) spin amplitude actually applied to the fiber" or, concisely, "actual spin amplitude", there is meant the actually applied spin amplitude, imparted to the optical fiber during the drawing process, and measured on the glass fiber between the furnace and the primary coating applicator; the spin amplitude actually applied to the fiber during drawing is typically different from the nominal spin (function) amplitude, applied to the fiber by a spinning device, owing to the presence of frictional forces or other undesired effects (as discussed in WO 2004/058654).

Also, still for the purposes of the present invention, by "substantially sinusoidal spin function", it is meant a spin function wherein the magnitude of the coefficient for one of its oscillatory components (the fundamental component in a Fourier series) dominates the magnitude of the coefficients for all other oscillatory components (the secondary components) as well as the coefficient for any constant component. In quantitative terms, domination occurs when the magnitude of the coefficient for the fundamental component is at least about three times the magnitude of the coefficient for each of the secondary components and the coefficient of the constant component. The magnitude of said coefficients can be determined by performing a complex Fourier analysis of the spin function using conventional techniques well known in the art.

Preferably, said ratio of said actual spin amplitude to said spin period is approximately equal to 1.

In particular, the step of determining an actual spin amplitude comprises the step of detecting a diameter of the optical fiber downstream said softened preform end portion.

The method may further comprise the step of adjusting the spin amplitude based on the determined actual spin amplitude.

According to another aspect of the present invention, an optical fiber is provided, having a frozen-in substantially sinusoidal spin having a spin amplitude and a spin period, characterized in that a ratio of said spin amplitude to said spin period of said frozen-in substantially sinusoidal spin is in the range:
from 0.2 to 0.6 turns/$m^2$ if the spin period is comprised between 1.7 and 3.3 m;
from 0.4 to 0.7 turns/$m^2$ if the spin period is comprised between 1.2 and 6.7 m;
from 0.5 to 1.2 turns/$m^2$ if the spin period is comprised between 6.7 and 15 m.

BRIEF DESCRIPTION OF THE DRAWINGS

The features and advantages of the present invention will be made apparent by the following detailed description of an embodiment thereof, provided merely by way of non-limitative example, description that will be conducted making reference to the attached drawings, wherein:

FIG. 1 is a very schematic, pictorial view of a section of an optical fiber spun with a substantially sinusoidal spin function;

FIG. 2 shows in diagrammatic form a simple, exemplary substantially sinusoidal spin function (turns/m in ordinate vs fiber length, in meter, in abscissa) applied to the optical fiber of FIG. 1 during a drawing process thereof;

DETAILED DESCRIPTION OF THE PREFERRED EMBODIMENT

With reference to the drawings, in FIG. 1 a short section 100 of a spun optical fiber 105 is schematically shown. In particular, the fiber 105 is an alternately-spun fiber, with an alternate and, more specifically, substantially sinusoidal spin profile, in the example a trapezoidal spin profile 200, schematically depicted in FIG. 2. The spin profile 200, expressed in terms of spin amplitude (or spin rate), in turns per meter, as a function of the fiber length, taken along the z axis, in meters, is intended to represent the spin actually frozen-in in the fiber (as discussed in the following, the frozen-in spin does not coincide with the applied spin that is imparted to the fiber by a properly controlled spinning device during the fiber drawing process).

Optical fiber sub-sections 110+ and 110− are defined wherein the fiber 105 is spun, e.g., clockwise and counterclockwise, respectively, the sub-sections 110+ and 110− being alternated to one another along the fiber axis z. Within the generic sub-section 110+, 110−, moving along the z axis, the spin amplitude initially increases (in absolute value), starting from a substantially zero value up to a maximum spin amplitude value SAmax, then it remains constant at that value for a certain length, then decreases to zero. The sites 115 at which the spin amplitude falls to zero are the spin-direction inversion sites. The spin function is periodic, and the distance between consecutive inversion sites 115 is the spin inversion period Ti, which is half as large as the spin function period T.

Figure 3:
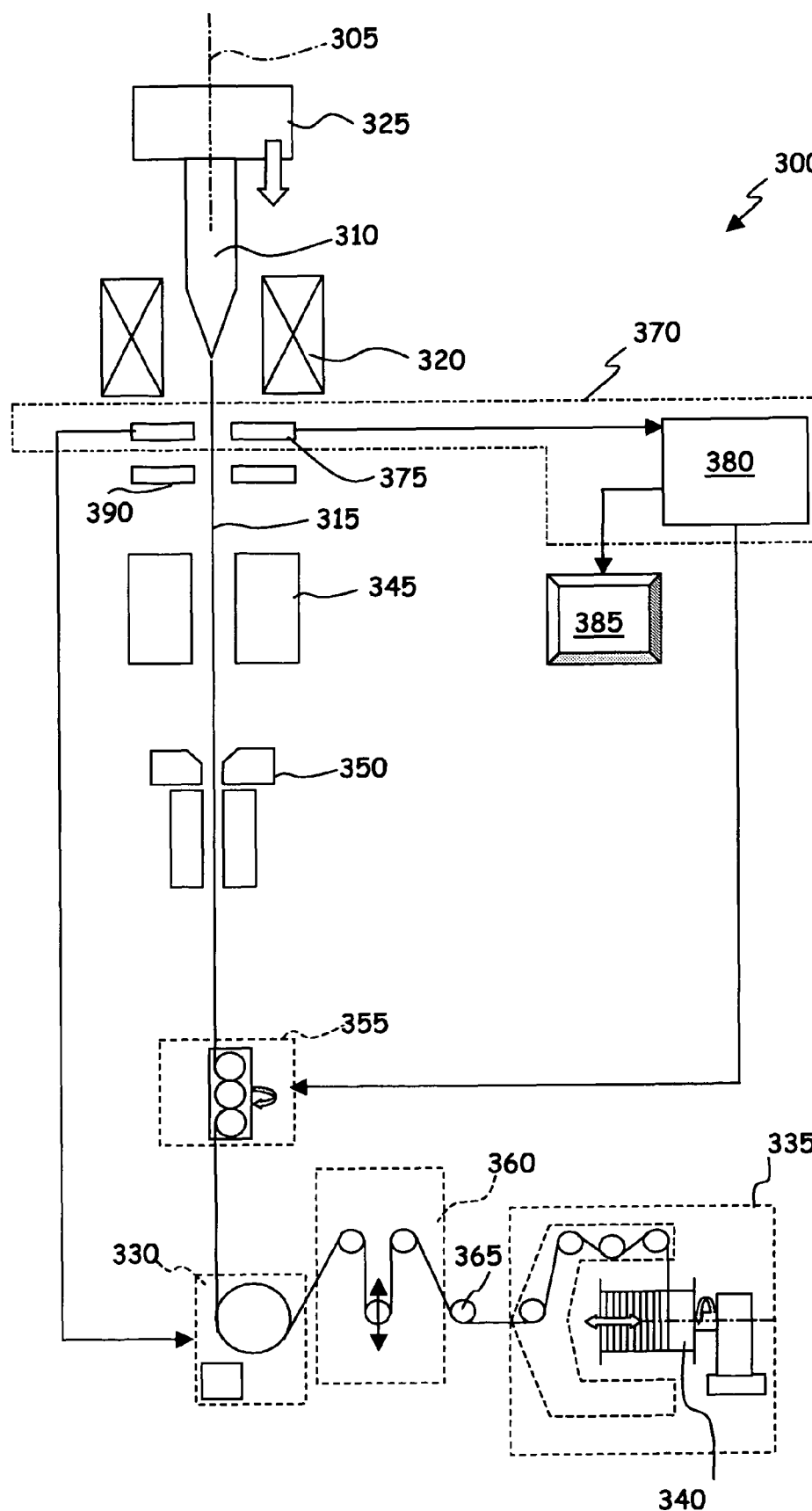
FIG. 3 schematically shows a drawing tower adapted to draw and spin fibers.

In FIG. 3, an apparatus adapted to produce spun optical fibers of the type discussed above is schematically depicted. It is understood that this apparatus is not limitative to the present invention, any other apparatus adapted to produce alternately spun fibers being suitable.

In particular, the apparatus of FIG. 3 comprises a drawing tower 300 including a plurality of devices that are substantially aligned along a vertical drawing axis 305 (whence the term "lower"). The choice of a vertical direction in order to perform the main steps of the drawing process allows exploiting the gravitational force so as to obtain, from a glass preform 310, molten material from which an optical fiber 315 can be drawn.

In detail, the tower 300 comprises a furnace 320 for performing a controlled melting of a lower portion of the preform 310 (also known as "preform neckdown"), a feeding device 325 for supporting the preform 310 and feeding it into the furnace 320 from the above, a traction device 330 (at a lower end of the tower 300) for pulling the fiber 315 from the preform 310, and a winding device 335 for winding and storing the fiber 315 onto a reel 340.

The furnace 320 may be of any type designed to produce a controlled melting of a preform. Examples of furnaces that can be used in the tower 300 are described in the U.S. Pat. No. 4,969,941 and U.S. Pat. No. 5,114,338.

Preferably, a cooling device 345, for example of a type having a cooling cavity designed to be passed through by a flow of cooling gas, may be situated underneath the furnace 320 for cooling the fiber 315 leaving it. The cooling device 345 is arranged coaxially to the axis 305, so that the fiber 315 leaving the furnace 320 can pass through it.

The tower 300 may further comprise coating devices 350 of a known type, positioned underneath the cooling device 345 in the vertical drawing direction and designed to deposit onto the fiber 315, as it passes through, one or more protective coatings, including for example UV-curable resin.

The traction device 330 may be of the single pulley or double pulley type, and it may comprise a single motor-driven traction pulley (or "capstan") designed to draw the fiber 315, already coated, in the vertical drawing direction. The traction device 330 may be provided with an angular speed sensor that is designed to generate a signal indicating the angular speed of the traction pulley during its operation.

The tower 300 further comprises a spinning device 355, positioned between the coating devices 350 and the traction device 330, adapted to impart a spin to the fiber 315 about its axis during drawing. In particular, the spinning device 355 is adapted to apply to the fiber 315 an alternate spin function, more particularly a substantially sinusoidal spin function, for example of the type depicted in FIG. 2, or any other substantially sinusoidal spin function.

The tower 300 may also comprise a tension-control device 360 (also referred to as "dancer"), for adjusting the tension of the fiber 315 downstream the traction device 330, and particularly for counterbalancing any variations in tension of the fiber 315 between the traction pulley and the winding device 335.

One or more pulleys 365 (or other types of guiding members) are advantageously provided for guiding the fiber 315 from the tension-control device 360 to the winding device 335.

As described in the European patent EP 1 226 415, the spin actual applied to the optical fiber differs from the spin applied to the fiber by the spinning device 355 during the fiber drawing; this is for example due to phenomena of viscous friction, occurring for example within the coating devices 350 (giving rise to resistant torques contrasting the torque applied by the spinning device).

In order to control the drawing process according to a determined actual spin imparted to the fiber, the tower 300 further comprises an equipment 370 adapted to carry out the on-line measurement and control of the spin applied to the optical fiber 315 by the spinning device 355. In particular, the equipment 370 is of the type described in EP 1 226 415, which is incorporated herein by reference, and which discloses a method for measuring the spin imparted to an optical fiber, and a process of drawing an optical fiber using the measuring method. The equipment 370 is used to measure the actually applied spin (actually applied spin amplitude), imparted to the optical fiber; this actually applied spin is typically different from the nominal spin (nominal spin amplitude), applied to the fiber by the spinning device 355, owing to the presence of frictional forces or other undesired effects. The equipment 370 comprises a diameter monitor 375 and a processing unit 380 capable of processing a signal generated by the diameter monitor 375. The diameter monitor 375 may comprise an optical sensor, for example of the interferometric type, located on the axis 305 between the furnace 320 and the coating devices 350, particularly between the furnace and the cooling device 345, and has its output connected to the processing unit 380. The diameter monitor 375 is capable of generating an electrical signal indicating the detected diameter of the optical fiber 315 and to be sent to the processing unit 380. The processing unit 380 has its output connected to the spinning device 355, for controlling the operation thereof, and to a display unit 385, adapted to present information (for example the measurement data) to an operator.

The rotation speed of the traction pulley and, therefore, the drawing speed of the fiber 315, may also be controlled in a response to a diameter variation detected by the diameter monitor 375.

The tower 300 may further be provided with a tension-monitoring device 390 (for example of the type described in the U.S. Pat. No. 5,316,562), preferably positioned between the furnace 320 and the cooling device 345, for measuring the tension of the fiber 315.

In operation, the supporting device 325 feeds the preform 310 to the furnace 320, where a lower portion of the preform (the neckdown) is melted. The fiber 315 drawn from the neckdown is pulled down by the traction device 330, and wound onto the reel 340 by the winding device 335.

When exiting the furnace 320, the fiber 315 is cooled by the cooling device 345 and it is coated with one or more protective layers by the coating devices 350.

On the coated fiber 315 an alternate, substantially sinusoidal spin is then applied by the spinning device 355.

When applied the spin, the fiber 315 transmits a corresponding torque upstream to the preform neckdown, where the plastic deformation of the melted glass "absorbs" the torque and "transforms" it into an intrinsic orientation of the birefringence axes of the fiber 315. This intrinsic torsion is frozen into the fiber 315 as the fiber cools.

During the fiber drawing, the equipment 370 determines the actual spin imparted to the fiber at the preform neckdown, on the basis of the measurement of the diameter of the optical fiber. As disclosed in the European patent EP 1 226 415, the asymmetries and anisotropies of the optical fiber cause an oscillation of the measured diameter value between a minimum and a maximum value, with a frequency which is correlated with the fiber rotation speed. By processing the diameter measurements, it is possible to obtain information indicating the actual spin imparted to the optical fiber. In particular, this information can be obtained by carrying out a Fourier transform of the time signal related to the diameter measurement of the optical fiber and a subsequent analysis of the peaks of the corresponding power spectrum. This information is used retroactively to control the spinning device 355, so that the spin function applied by the spinning device to the fiber is such as to produce a fiber with an actually applied spin corresponding to the target spin. Also, the information is displayed on the display 385, so that the operator can know which is the actual spin applied to the fiber.

However, as described in WO 2004/058654, the indication provided by the equipment 370 is not the actual spin frozen into the fiber after cooling; the spin actually frozen into the fiber depends, in addition to the actual spin applied to the preform neckdown, as deduced by the equipment 370, on the spin period, on the fiber drawing speed and on the length of the section of fiber which is in a viscous status. In particular, in WO 2004/058654 it is reported that the spin amplitude actually frozen in the fiber after cooling is at most 50% the spin amplitude actually applied to the fiber if the spin period is between 1.2 and 6.7 m, and at most 60% if the spin period is between 1.7 and 3.3 m. The Applicant has experimentally found that, as mentioned in the foregoing, alternate spin profiles applied to a fiber while drawing it reduce the fiber birefringence, and thus increases the fiber beat length.

In particular, the Applicant has experimentally found that a proper choice of the parameters of a spin function applied to the fiber unexpectedly leads to a reduction in the fiber birefringence, and thus to an increase in the beat length of the spun fiber, compared to birefringence, respectively the beat length, of a similar, but unspun fiber.

The Applicant has in particular found that a significant increase in the beat length of the spun fiber can be achieved by applying a substantially sinusoidal spin function to the fiber while drawing it, wherein a value of the spin amplitude actually applied to the fiber (i.e. the spin amplitude at the preform neckdown, derived for example by the equipment 370 based on the detected diameter), in turns per meter, falls in a range from approximately 0.8 to approximately 1.4 times the spin period, and preferably around 1.0.

As known from WO 2004/058654, the spin amplitude actually frozen in the fiber after cooling can substantially differ from the spin amplitude actually applied to the fiber, depending on the spin period, and can be as low as 50%. The beat length increase is experienced for ratios of the frozen-in spin amplitude to the spin period in the range from approximately 0.4 to approximately 0.7 turns/m² for spin periods between 1.2 and 6.7 m. For spin period between 1.7 and 3.3 m, the beat length increase is experienced for ratios of the frozen-in spin amplitude to the spin period in the range from approximately 0.2 to approximately 0.6 turns/m². For spin periods between 6.7 and 15 m, the beat length increase is experienced for ratios of the frozen-in spin amplitude to the spin period in the range from approximately 0.5 to approximately 1.2 turns/m².

The above result has been confirmed by some measurement campaigns conducted by the Applicant; in particular, the Applicant has conducted a measurement campaign on six optical fibers, all drawn from a same preform, using an arrangement like the one depicted in FIG. 3, applying a sinusoidal spin function; the drawing speed was 12 m/s, and the spin conditions were modified so as to change the spin amplitude and other spin parameters in order to obtain the values reported in the following table:

TABLE 1

| Drawn fiber | Spin period ([m]) | Actually imparted spin amplitude ([turns/m]) | Actual imparted spin amplitude/ spin period ([turns/m²]) | Beat length variation (%) |
|---|---|---|---|---|
| Fiber 1 | 3.1 | 4.58 | 1.48 | 11 |
| Fiber 2 | 0 (unspun) | 0 (unspun) | — | — |
| Fiber 3 | 4.6 | 3.96 | 0.86 | 45 |
| Fiber 4 | 0 (unspun) | 0 (unspun) | — | — |
| Fiber 5 | 9.2 | 1.25 | 0.14 | 14 |
| Fiber 6 | 0 (unspun) | 0 (unspun) | — | — |

The Applicant conducted a further measurement campaign on twelve optical fibers, all drawn from a same preform, using an arrangement like the one depicted in FIG. 3, applying a sinusoidal spin function; this time the drawing speed was 18 m/s, and the spin conditions were modified so as to change the spin amplitude and other spin parameters in order to obtain the values reported in the following table:

TABLE 2

| Drawn fiber | Spin period ([m]) | Actually imparted spin amplitude ([turns/m]) | Actual imparted spin amplitude/ spin period ([turns/m²]) | Beat length variation (%) |
|---|---|---|---|---|
| Fiber 1 | 4.5 | 2.37 | 0.53 | 47 |
| Fiber 2 | 0 (unspun) | 0 (unspun) | — | — |
| Fiber 3 | 4.8 | 2.82 | 0.59 | 25 |
| Fiber 4 | 0 (unspun) | 0 (unspun) | — | — |
| Fiber 5 | 4.1 | 4.18 | 1.02 | 100 |
| Fiber 6 | 0 (unspun) | 0 (unspun) | — | — |
| Fiber 7 | 4.64 | 6.83 | 1.47 | 25 |
| Fiber 8 | 0 (unspun) | 0 (unspun) | — | — |
| Fiber 9 | 4.35 | 6.1 | 1.4 | 31 |
| Fiber 10 | 0 (unspun) | 0 (unspun) | — | — |
| Fiber 11 | 4.3 | 6.12 | 1.42 | 56 |
| Fiber 12 | 0 (unspun) | 0 (unspun) | — | — |

The beat length in the drawn (spun and unspun) fibers was measured according to the technique disclosed in M. Ferrario, S. M. Pietralunga, R. Bratovich and M. Martinelli, "*Alternate Spin Profile Reconstruction in Low-PMD Fibers*", JThE52, 2005 Quantum Electronics and Laser Science Conference (QELS), pp. 1714-1716.

Figure 4:
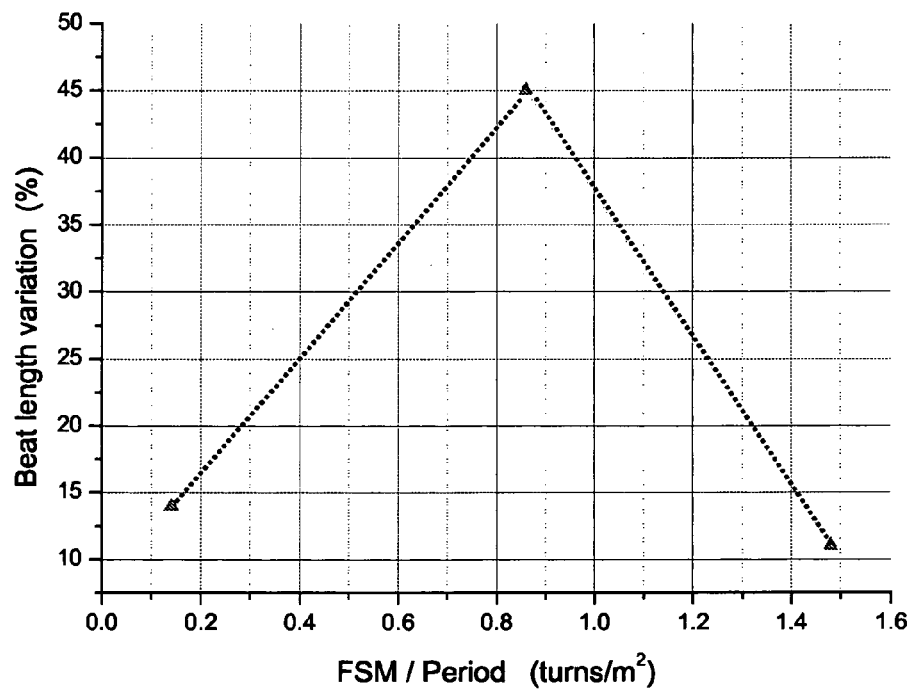
FIG. 4 shows a diagram with in abscissa values of a ratio of spin amplitude actually imparted to the fiber during drawing to the spin period, and, in ordinate, an indication of the resulting increase, in percentage, of the fiber beat length, plotting the results of a first measurements campaign conducted by the Applicant on some samples of optical fibers.

The results reported in Table 1 above are plotted in the diagram of FIG. 4, wherein the abscissa represents values of the ratio of the actually imparted spin amplitude to the spin period, and the ordinate represents the percentage of beat length variation compared to the unspun case.

It can be appreciated that the beat length increases for values of the ratio of the actually imparted spin amplitude to the spin period increasing towards approximately 1 turns/m², after which the beat length decreases. The increase in beat length can be up to 40-50%.

Figure 5:
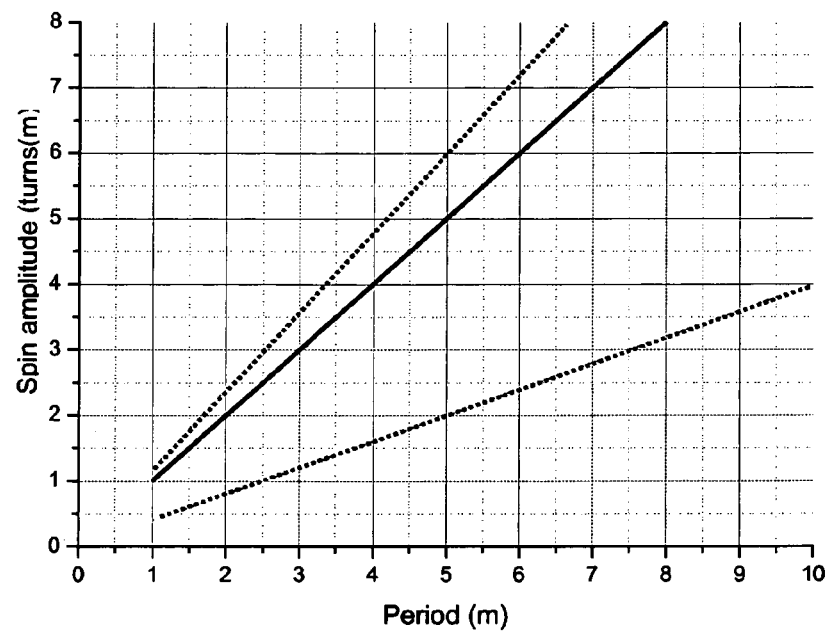
FIG. 5 is a diagram, drawn on the basis of the results of the first measurements campaign, with in abscissa values of the spin period and, in ordinate, the value of the spin amplitude actually imparted to the fiber during drawing, plotting an area of the plane for which the fiber beat length exhibits a non-negligible increase, thus providing a guidance for the choice of the spin function parameters.
Figure 6:
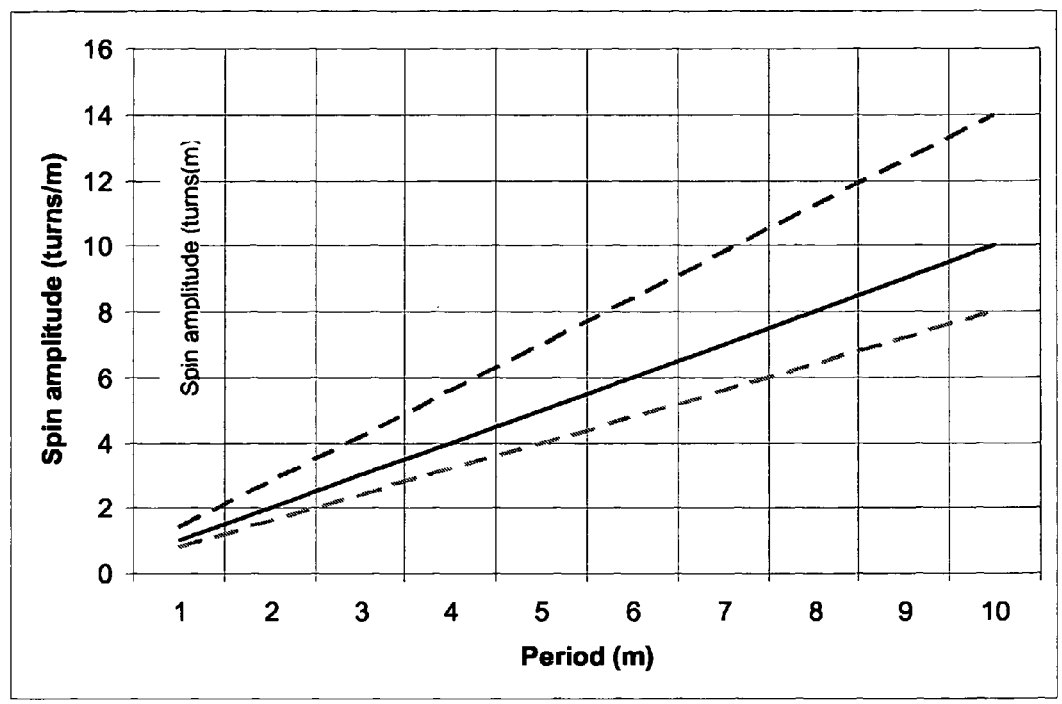
FIG. 6 is a diagram similar to that of FIG. 5, drawn on the basis of the results of a second measurements campaign conducted by the Applicant.

The diagram in FIG. 5 may be useful as a guidance for the choice of the spin function parameters; in abscissa the spin period is drawn (in meters), whereas the ordinate represents the actually imparted spin amplitude (turns/meter). The solid line represents a best choice (it corresponds to a value of the ratio of the actually imparted spin amplitude to the spin period approximately equal to 1 turns/m²); the two dotted lines set the extremes of a preferred range of values for the ratio of the actually imparted spin amplitude to the spin period. A similar diagram, but drawn on the basis of the results reported in Table 2 above, is depicted in FIG. 6.

In the above cases, applying the technique disclosed in M. Ferrario, S. M. Pietralunga, R. Bratovich and M. Martinelli, "*Alternate Spin Profile Reconstruction in Low-PMD Fibers*", it was determined that the amplitude of the spin function actually imparted to the fiber is approximately equal to 2±0.5 times the spin amplitude actually frozen in the fiber after cooling.

Thus, the Applicant has found that, by properly tailoring the spin function parameters, it is possible to increase the fiber beat length. This is advantageous because it allows increasing the range of useful spin function periods.

Indeed, as discussed in the foregoing, according to WO 2002/03115, optimized spin functions can be determined that allow reducing the fiber PMD, but the spin functions remain optimized irrespective of the fiber beat length only provided that the spin period is shorter that the beat length; thus, for a given spin period, fibers having a beat length comparable to or shorter than the spin period are not optimized, from the viewpoint of PMD reduction, by the application of such a spin function. Since the fiber beat length is unknown a priori (i.e., before drawing the fiber), and it varies along the fiber, choosing short spin periods would make it more probable that the spin function is optimized, from the viewpoint of PMD reduction, for a larger population of fibers. However, a too short spin period is not advantageous, because the transferred spin amplitude decreases, as disclosed in WO 2004/058654.

Thanks to the present invention, it is possible to tailor the spin function so that an increase in the fiber beat length (compared to the unspun case) is experienced; thus, it is possible to choose a longer spin period, with the advantage of not incurring in the problems of reduced spin amplitude transfer, while being reasonably sure that the condition that the spin period be lower than the fiber beat length (i.e. that the reduction in PMD achieved by applying the spin function is substantially independent from the fiber beat length) holds true for a larger population of fibers.

For example, the Applicant has experimentally found that commercially available fibers have beat lengths ranging from 2 to 20 m, and more typically from 4 to 10 m, whereas spin periods range from approximately 1 to 15 m. Considering a fiber having a beat length of 4 m, a spin period lower than 4 m should be used to draw a fiber with reduced PMD. According to the present invention, assuming to apply, during its drawing, a tailored spin function having parameters satisfying the above criterion (in terms of value of the ratio of the actually imparted spin amplitude to the spin period), and particularly a spin function adapted to lead to a rough 50% increase in beat length, the beat length of the spun fiber would be approximately 6 m. Thus, a spin function with a spin period of up to 5 m or even close to 6 m can be used to reduce the fiber PMD; therefore, a useful range of possible spin periods for such a fiber is extended of up to 2 m.

In particular, in an embodiment of the present invention, the spin period may be chosen so as to be lower than the beat length of the fiber measured after applying the spin function thereto; the choice of the spin period determines the choice of the spin function amplitude (the ratio of the actually applied spin amplitude to the spin period should fall in the predetermined range). This allows using the spin function for reducing PMD in respect of fibers having a relatively wide range of beat length values. In particular, the spin period may be chosen in the range from the value of the beat length of the unspun fiber to the value of the beat length of the spun fiber (i.e., the increased beat length, according to the present invention). In the practice, a spin period ranging from 3 to 15 m, preferably from 3 to 6 m, and more preferably from 4 to 5 m can be chosen, and the spin amplitude be tailored accordingly.

The invention claimed is:

1. A method of making an optical fiber, comprising:
   heating an end portion of an optical fiber preform so as to obtain a softened preform end portion;
   drawing the softened preform end portion to form the optical fiber;
   varying a beat length of the optical fiber by applying to the optical fiber a substantially sinusoidal spin having a nominal spin amplitude and a spin period, the substantially sinusoidal spin being transmitted proximate to the softened preform end portion;
   determining an actual spin amplitude applied to the optical fiber, wherein said actual spin amplitude is a measured spin amplitude imparted to the optical fiber; and,
   determining a ratio of said actual spin amplitude to said spin period to ccicct adjust the nominal spin amplitude and the spin period of the substantially sinusoidal spin such that said ratio is in a range of approximately 0.8 to approximately 1.4 turns/m$^2$.

2. The method of claim 1, wherein said ratio of said actual spin amplitude to said spin period is approximately 1.

3. The method of claim 1, wherein the step of determining an actual spin amplitude comprises the step of detecting a diameter of the optical fiber downstream said softened preform end portion.

4. The method of claim 1, further comprising the step of adjusting the nominal spin amplitude based on a determined actual spin amplitude.

* * * * *